US012780137B2

(12) United States Patent
Girard et al.

(10) Patent No.: US 12,780,137 B2
(45) Date of Patent: Nov. 3, 2026

(54) ADJUSTING SEATBELT TENSION BASED ON A PHYSICAL IMPAIRMENT

(71) Applicant: Toyota Motor Engineering & Manufacturing North America, Inc., Plano, TX (US)

(72) Inventors: Nicole C. Girard, Ypsilanti, MI (US); Benjamin Piya Austin, Saline, MI (US); Jennifer J. Angel, Manchester, MI (US); Debby C. Byrne, Onsted, MI (US)

(73) Assignees: Toyota Motor Engineering & Manufacturing North America, Inc., Plano, TX (US); Toyota Jidosha Kabuhiki Kaisha, Toyota Aichi-ken (JP)

( * ) Notice: Subject to any disclaimer, the term of this patent is extended or adjusted under 35 U.S.C. 154(b) by 36 days.

(21) Appl. No.: 18/984,109

(22) Filed: Dec. 17, 2024

(65) Prior Publication Data

US 2026/0200426 A1 Jul. 16, 2026

(51) Int. Cl.
*B60R 21/01* (2006.01)
*B60R 21/015* (2006.01)
*B60R 22/44* (2006.01)

(52) U.S. Cl.
CPC ........ *B60R 21/01538* (2014.10); *B60R 22/44* (2013.01); *B60R 2021/01272* (2013.01)

(58) Field of Classification Search
CPC .............. B60R 21/01538; B60R 22/44; B60R 2021/01272
See application file for complete search history.

(56) References Cited

U.S. PATENT DOCUMENTS

| | | | | |
|---|---|---|---|---|
| 6,019,392 | A | 2/2000 | Karlow | |
| 6,705,559 | B1 | 3/2004 | Sullivan et al. | |
| 6,820,897 | B2 | 11/2004 | Breed et al. | |
| 8,371,414 | B2 | 2/2013 | Gorman et al. | |
| 10,124,762 | B2 | 11/2018 | Hennes et al. | |
| 11,465,635 | B2 * | 10/2022 | Glazman | B60R 21/015 |
| 2020/0139863 | A1 * | 5/2020 | Mori | B60N 2/42763 |
| 2022/0032820 | A1 | 2/2022 | Orava et al. | |
| 2023/0278522 | A1 * | 9/2023 | Wigger | B60R 22/28 280/806 |
| 2023/0406256 | A1 * | 12/2023 | Gaither | B60R 22/03 |

FOREIGN PATENT DOCUMENTS

JP 2008081068 A * 4/2008

* cited by examiner

*Primary Examiner* — Joseph J Dallo
(74) *Attorney, Agent, or Firm* — Christopher G. Darrow; Darrow Mustafa PC

(57) ABSTRACT

Embodiments described herein relate to seatbelt systems for vehicles. In one implementation, a system includes a processor and a memory in communication with the processor. The memory stores a module including instructions that, when executed by the processor, cause the processor to detect, based on data regarding an occupant of a vehicle, a physical impairment of a body portion of the occupant. The instructions further cause the processor to adjust, based on the physical impairment, an amount of tension applied to a portion of the seatbelt contacting the body portion.

11 Claims, 4 Drawing Sheets

ADJUSTING SEATBELT TENSION BASED ON A PHYSICAL IMPAIRMENT

TECHNICAL FIELD

The subject matter described herein relates, in general, to seatbelt systems for vehicles and, more particularly, to adjusting the tension of a seatbelt of a vehicle according to a physical impairment of an occupant of the vehicle.

BACKGROUND

Many vehicles include seatbelt arrangements that restrain an occupant of the vehicle during a dangerous driving event such as a collision. These seatbelt arrangements contact various body parts of the occupant. However, in some instances, occupants may have injuries or physical disorders that cause pain in these body parts. Accordingly, some occupants may feel increased pain when wearing a seatbelt, and thus may avoid wearing the seatbelt or may wear the seatbelt incorrectly to avoid putting pressure on these body parts. In these scenarios, the occupant may be at a greater risk of additional injury in the event of a collision.

SUMMARY

As noted above, in some instances, vehicle occupants who have injuries or disorders may have difficulties wearing seatbelts. Accordingly, the embodiments described herein are directed to a seatbelt system that adjusts the tension of a seatbelt according to a physical impairment of an occupant. In one approach, the system acquires data regarding the occupant. This data can include health data, sensor data, data input by the occupant, or other types of data that may indicate a physical impairment of the occupant that may be regionalized, such as an injury or a body area with pain. Based on the data, in one approach, the system identifies a physical impairment of a body portion of the occupant. In one embodiment, based on the physical impairment, the system adjusts the tension applied to the seatbelt to make the seatbelt more comfortable for the occupant. In one embodiment, adjusting the tension involves decreasing the tension applied to a portion of the seatbelt contacting the body part of the occupant with the physical impairment. As a result, the occupant may feel less pressure by the seatbelt on the body part with the physical impairment, thus improving use of the seatbelt by making the seatbelt more comfortable and less painful for the occupant to wear. Furthermore, by adjusting the tension of the seatbelt, the system helps to minimize the chances of incurring further injury, discomfort, or pain to the body area with the physical impairment.

In one embodiment, a system includes a processor and a memory in communication with the processor. The memory stores a module including instructions that, when executed by the processor, cause the processor to identify, based on data regarding an occupant of a vehicle, a physical impairment of a body portion of the occupant. The instructions further cause the processor to adjust, based on the physical impairment, an amount of tension applied to a seatbelt of the occupant by decreasing an amount of tension applied to a portion of the seatbelt contacting the body portion.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Systems and other embodiments associated with seatbelt arrangements for vehicles are disclosed. As noted above, in some instances, vehicle occupants who have injuries or disorders causing body pain or discomfort may have difficulties wearing seatbelts. Accordingly, the embodiments described herein are directed to a seatbelt system that adjusts the tension of a seatbelt according to a physical impairment of an occupant. In one approach, the system acquires data regarding the occupant such as health data, sensor data, data input by the occupant, or other types of data that may indicate a physical impairment of the occupant, such as an injury or a body area with pain. Based on the data, in one approach, the system identifies a physical impairment of a body portion of the occupant. In one embodiment, based on the physical impairment, the system adjusts the tension applied to the seatbelt to make the seatbelt more comfortable for the occupant. In one embodiment, adjusting the tension involves decreasing the tension applied to a portion of the seatbelt contacting the body part of the occupant with the physical impairment. As a result, the occupant may feel less pressure by the seatbelt on the body part with the physical impairment, thus making the seatbelt more comfortable and less painful for the occupant to wear.

Figure 1:
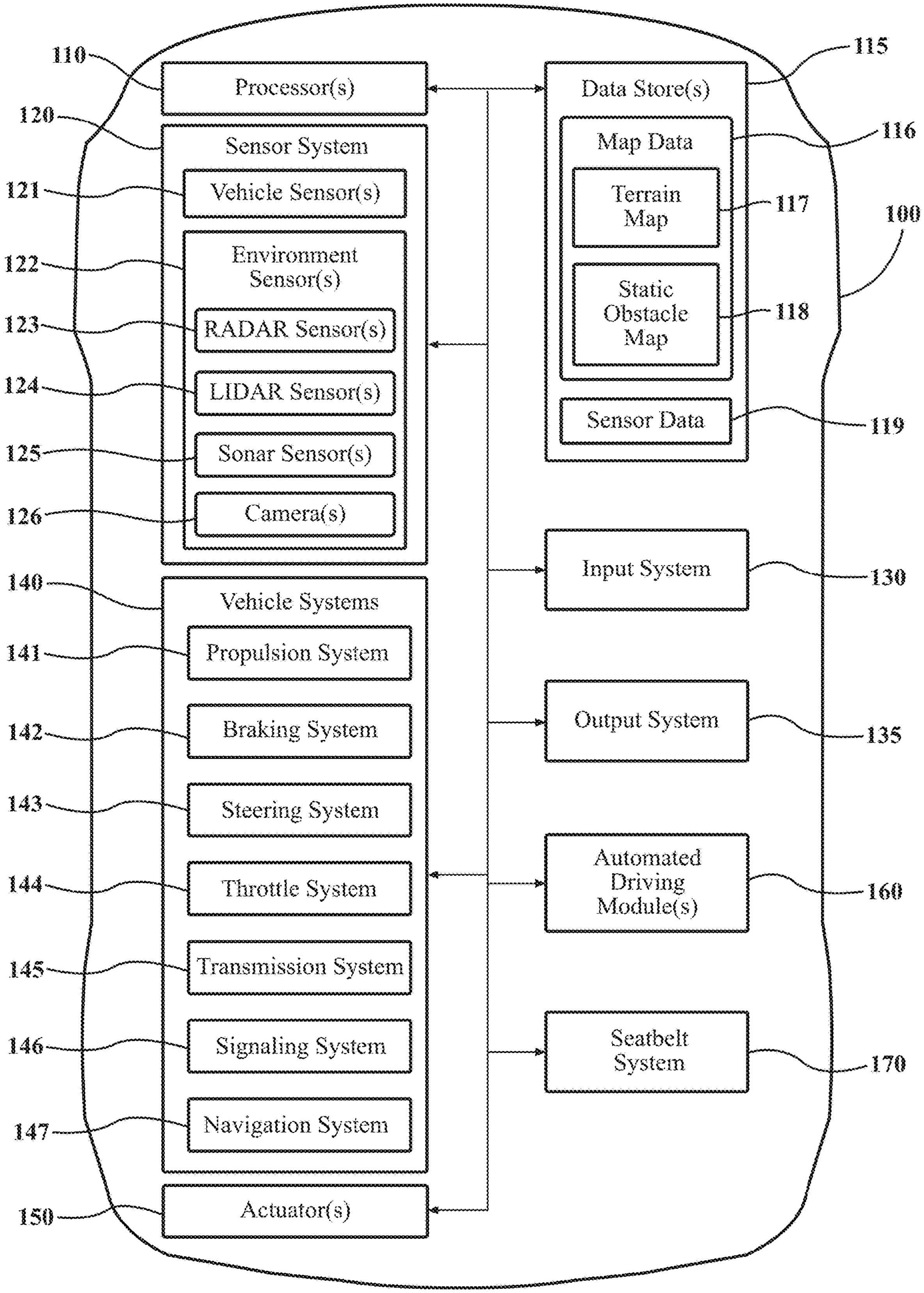
FIG. 1 illustrates one example of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be another form of motorized transport such as a train or an aircraft that may be human-operated or otherwise interface with human passengers. The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100 while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2:
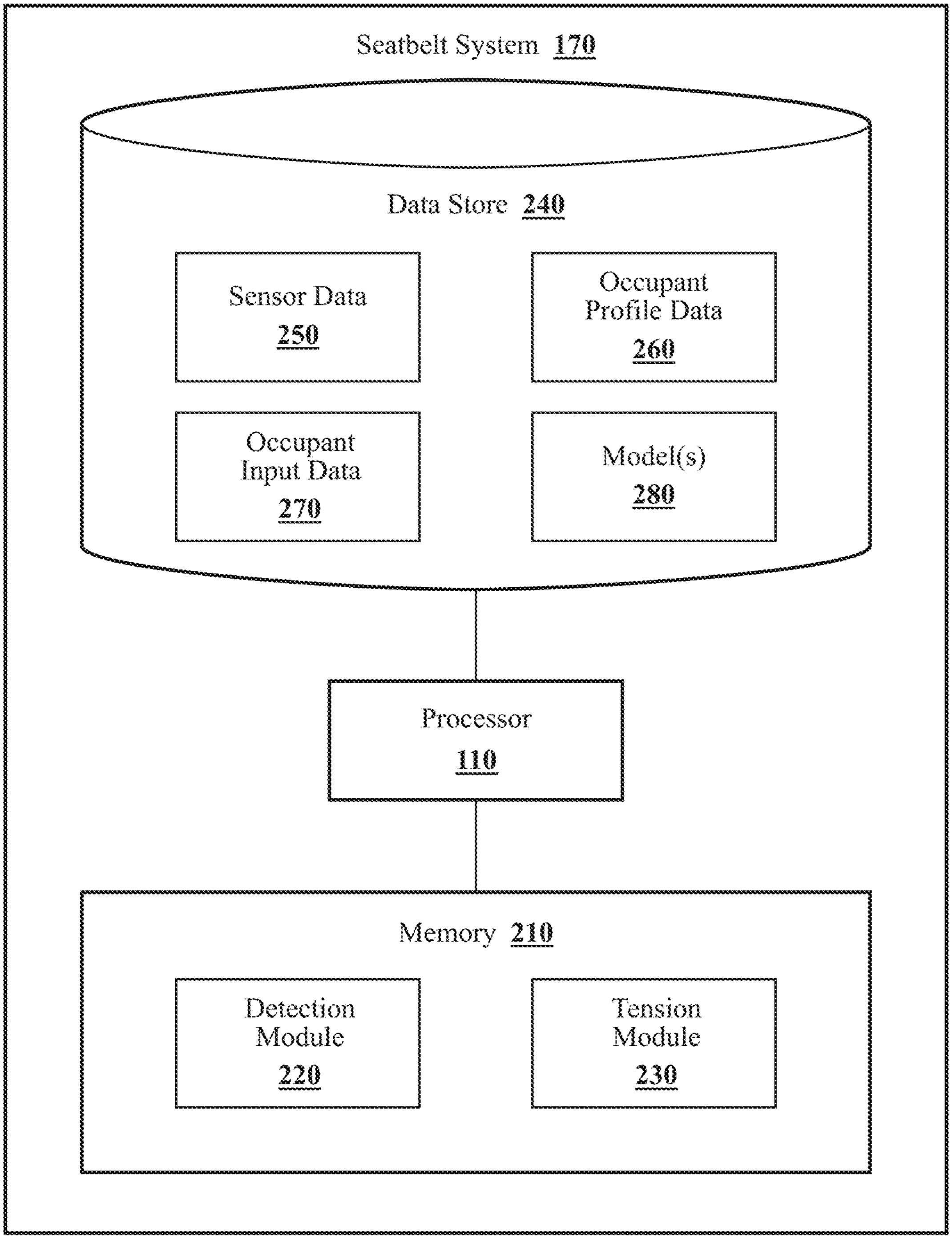
FIG. 2 illustrates one example of a seatbelt system that is associated with a seatbelt arrangement of a vehicle.

In any case, the vehicle 100 includes a seatbelt system 170 that is implemented to perform methods and other functions disclosed herein relating to adjusting the tension of a seatbelt of an occupant of a vehicle. With reference to FIG. 2, one embodiment of the seatbelt system 170 of FIG. 1 is further illustrated. The seatbelt system 170 is shown as including a processor 110 from the vehicle 100 of FIG. 1. Accordingly, the processor 110 may be a part of the seatbelt system 170, the seatbelt system 170 may include a separate processor from the processor 110 of the vehicle 100, or the seatbelt system 170 may access the processor 110 through a data bus or another communication path. In one embodiment, the seatbelt system 170 includes a memory 210 that stores a detection module 220 and a tension module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. In alternative arrangements, the modules 220 and 230 are independent elements from the memory 210 that are, for example, comprised of hardware elements. Thus, the modules 220 and 230 are alternatively ASICs, hardware-based controllers, a composition of logic gates, or another hardware-based solution.

With continued reference to FIG. 2, in one embodiment, the seatbelt system 170 includes a data store 240. The data store 240 is, in one embodiment, an electronic data structure stored in the memory 210 or another data store that is configured with routines that can be executed by the processor 110 for analyzing stored data, providing stored data, organizing stored data, and so on. Thus, in one embodiment, the data store 240 stores data used by the modules 220 and 230 in executing various functions. In one approach, the data includes various types of data that the detection module 220 uses to detect a physical impairment of an occupant of the vehicle 100. Various types of data, including sensor data 250, occupant profile data 260, and occupant input data 270 will be described in further detail below. In any case, the data store 240 includes data along with, for example, metadata that characterize various aspects of the data. For example, the metadata can include location coordinates (e.g., longitude and latitude), relative map coordinates or tile identifiers, time/date stamps from when the separate data was generated, and so on. In one embodiment, the data store 240 stores the data. In one embodiment, as described in further detail below, the data store 240 also includes one or more model(s) 280 that may be leveraged to process the data.

As mentioned above, in one embodiment, the data includes sensor data 250, including observations of one or more objects and/or people in an external environment of the vehicle 100 and/or perceptions from within a passenger compartment of the vehicle 100. The sensor data 250 may include various perceptions from sensors of a sensor system 120 of the vehicle 100. For example, the detection module 220 generally includes instructions that function to control the processor 110 to receive data inputs from one or more sensors of the vehicle 100. As provided for herein, the detection module 220, in one embodiment, acquires the sensor data 250 that includes at least perceptions of occupants within the vehicle 100. The detection module 220 may further acquire information from cameras 126 about surroundings of the vehicle 100. In further arrangements, the detection module 220 acquires the sensor data 250 from further sensors such as a radar 123, a LiDAR 124, and other sensors. Additionally, the detection module 220, when acquiring sensor data 250 from multiple sensors, fuses the sensor data 250 together to form the sensor data 250 and to provide for improved determinations of detection.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250. Thus, the sensor data 250, in one embodiment, represents a combination of perceptions acquired from multiple sensors and/or other sources. As part of controlling the sensors to acquire the sensor data 250, it is generally understood that the sensors acquire the sensor data 250 of a region around the vehicle 100 and/or a region within the vehicle 100 with data acquired from different types of sensors generally overlapping in order to provide for a comprehensive sampling of the external environment and/or internal environment of the vehicle 100 at each time step. In general, the sensor data 250 need not be of the exact same bounded region in the surrounding environment and/or the internal environment but should include a sufficient area of overlap such that distinct aspects of the areas can be correlated.

In one approach, the detection module 220 implements and/or otherwise uses a machine learning algorithm, which may be one or more of the model(s) 280. In one configuration, the machine learning algorithm is embedded within the detection module 220, such as a convolutional neural network (CNN), to perform various perception approaches over the sensor data 250 from which further information is derived. Of course, in further aspects, the detection module 220 may employ different machine learning algorithms or implement different approaches for performing the machine perception, which can include deep neural networks (DNNs), recurrent neural networks (RNNs), or another form of machine learning. Whichever particular approach the detection module 220 implements, the detection module 220 provides various outputs from the information represented in the sensor data 250. In this way, the seatbelt system 170 is able to process the sensor data 250 into contextual representations.

As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, transformer-based models (e.g., large language models (LLMs)), etc. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the seatbelt system 170 generally trains the machine learning algorithm according to a particular training approach, which may include supervised training, self-supervised training, reinforcement learning, and so on. In contrast to training/learning of the machine learning algorithm, the seatbelt system 170 implements the machine learning algorithm to perform inference. Thus, the general use of the machine learning algorithm is described as inference.

In any case, the detection module 220 can use various types of data to detect a physical impairment of an occupant of the vehicle 100. In some cases, a physical impairment refers to a bodily injury or disorder that may be localized to a specific body part of the occupant (e.g., a regionalized physical impairment). For example, the physical impairment can be an injury such as a fractured or broken bone, a muscle or ligament tear, a bruise, a cut, a scrape, or another type of injury. In further examples, the physical impairment can arise from a physical or mental disorder that causes localized pain, for example, an area of low bone density, tendinitis, pain syndrome, nerve syndrome, etc. In still further examples, the physical impairment can be a generalized physical impairment. In other words, an occupant with a generalized physical impairment may have extensive pain or discomfort across multiple areas of his or her body. Moreover, the physical impairment can be one that does not cause the occupant pain, such as a physical deformity, limb difference, etc. In any case, it may be advantageous to adjust the tension of the seatbelt arrangement to alleviate some of the pain or discomfort of the occupant and/or to make the occupant more comfortable, as described in further detail below.

In any case, as mentioned above, the data includes perceptions of occupants of the vehicle 100, which may be collected by the sensor system 120. In one example, one or more cameras and/or RADAR sensors within the vehicle 100 or mounted to an exterior of the vehicle 100 are configured to detect an occupant of the vehicle 100. The occupant may be a driver of the vehicle 100 sitting in a driver seat of the vehicle 100, a passenger of the vehicle 100 sitting in a front or rear passenger seat of the vehicle 100, or a person approaching the vehicle 100 with the intent of entering the vehicle 100. In some instances, via the sensor system 120, the detection module 220 can monitor for and detect signs of injuries, pain, disorders, and/or impairments by scanning the occupant, for example, for visual indicators of a physical impairment. Visual indicators of a physical impairment include, in some examples, a sling, a bandage, a brace, a wound dressing, and/or another physical device that may indicate that the occupant is injured or in pain. In further examples, visual indicators of a physical impairment include a scar, a scab, a bruise, etc. In still additional examples, visual indicators can include facial expressions or body movements that may indicate a physical impairment, for example, a grimace, a clutching of a body part in pain, etc. In yet another example, a visual indicator of a physical impairment can be detected when an occupant is approaching the vehicle 100. For example, the detection module 220 can detect a physical impairment when the detection module 220 detects that the occupant is approaching the vehicle 100 with a limp, in a wheelchair, with a cane, with a walker, with crutches, etc. In still a further example, the detection module 220 can detect that the occupant is reaching for and/or opening a door of the vehicle 100 with his or her non-dominant arm, which may indicate a physical impairment associated with his or her dominant arm.

In yet another example, the detection module 220 can detect a physical impairment via contextual indicators of an impairment. Contextual indicators can include speech, dialogue, voice information, etc. from occupants of the vehicle 100. In one example, a single occupant of the vehicle 100 may make a statement or exclamation that may indicate the presence of a physical impairment. For example, a driver may enter the vehicle 100 and utter to himself or herself, "My shoulder really hurts." As another example, two or more occupants of the vehicle 100 may have a conversation that may indicate the presence of a physical impairment of one or more of the occupants. For example, a passenger of the vehicle 100 may tell a driver of the vehicle 100 that his or her shoulder hurts.

As mentioned above, in one approach, the detection module 220 additionally or alternatively detects a physical impairment using data that is not collected by the sensor system 120. In one embodiment, as mentioned above, the data includes occupant profile data 260. The occupant profile data 260 can include information about the occupants of the vehicle 100, including information about physical impairments. For example, the occupant profile data 260 can include information that an occupant has a shoulder injury. The occupant profile data 260 can be provided directly from the occupant, or the occupant profile data 260 can be provided indirectly, for example, from medical records with the consent of the occupant. In any case, in some instances, the occupant profile data 260 includes various information related to the physical impairment, such as the body location of the impairment, the type of impairment, when the impairment happened or began, the pain level and/or severity of the impairment, etc.

In another approach, another contextual indicator of a physical impairment may be data from a smartphone or other personal electronic device of the occupant, such as text messages, medical records, messages from health professionals, emails to friends, colleagues, etc., calendar events, etc., of the occupant. For example, text messages, with the consent of the occupant, may be linked to the occupant profile, and thus may be part of the occupant profile data 260. For example, the detection module 220 can analyze text message data to detect a physical impairment. In one example, an occupant may send a text to a family member or friend that reads, "I hurt my hip yesterday." In another example, a calendar appointment might indicate an upcoming MRI for a clavicle injury, which can indicate a physical impairment of the clavicle.

Continuing with data that is not collected by the sensor system 120, in one embodiment, the detection module 220 uses occupant input data 270 to detect a physical impairment. The occupant input data 270 includes, in one implementation, data that is electronically input by the occupant (s) to an input system 130 (described in further detail below in connection with FIG. 1) of the vehicle 100. For example, an occupant may input information related to a physical impairment, such as the body portion/location of the impairment, the type of impairment, when the impairment happened or began, the pain level and/or severity of the impairment, etc. In one example, the input system 130 displays an icon of a human body, and the occupant can tap or click on an area of the icon corresponding to the location of the impairment. In yet another example, the occupant inputs the name or type of impairment, and the detection module 220 can reference a database of impairments to associate the impairment with a body location.

When the detection module 220 detects a physical impairment, as mentioned above, the tension module 230, in some instances, is configured to adjust an amount of tension applied to one or more seatbelts associated with the occupant. Accordingly, the detection module 220, in one approach, correlates the occupant with a seat of the vehicle 100 so that the appropriate seatbelts are adjusted. Accordingly, referring back to the sensor data 250, the sensor data 250 can include various perceptions from within the passenger compartment that may facilitate a determination of which seat is associated with the occupant. The passenger compartment data includes, for example, the number of occupant(s) in the vehicle 100, where the occupant(s) are located within the vehicle 100, information from seat sensors of the vehicle 100, etc. In some approaches, the detection module 220 leverages this data to identify the appropriate seatbelts to be adjusted. One illustrative example of an arrangement of seatbelts will be described below with reference to FIG. 3.

Figure 3:
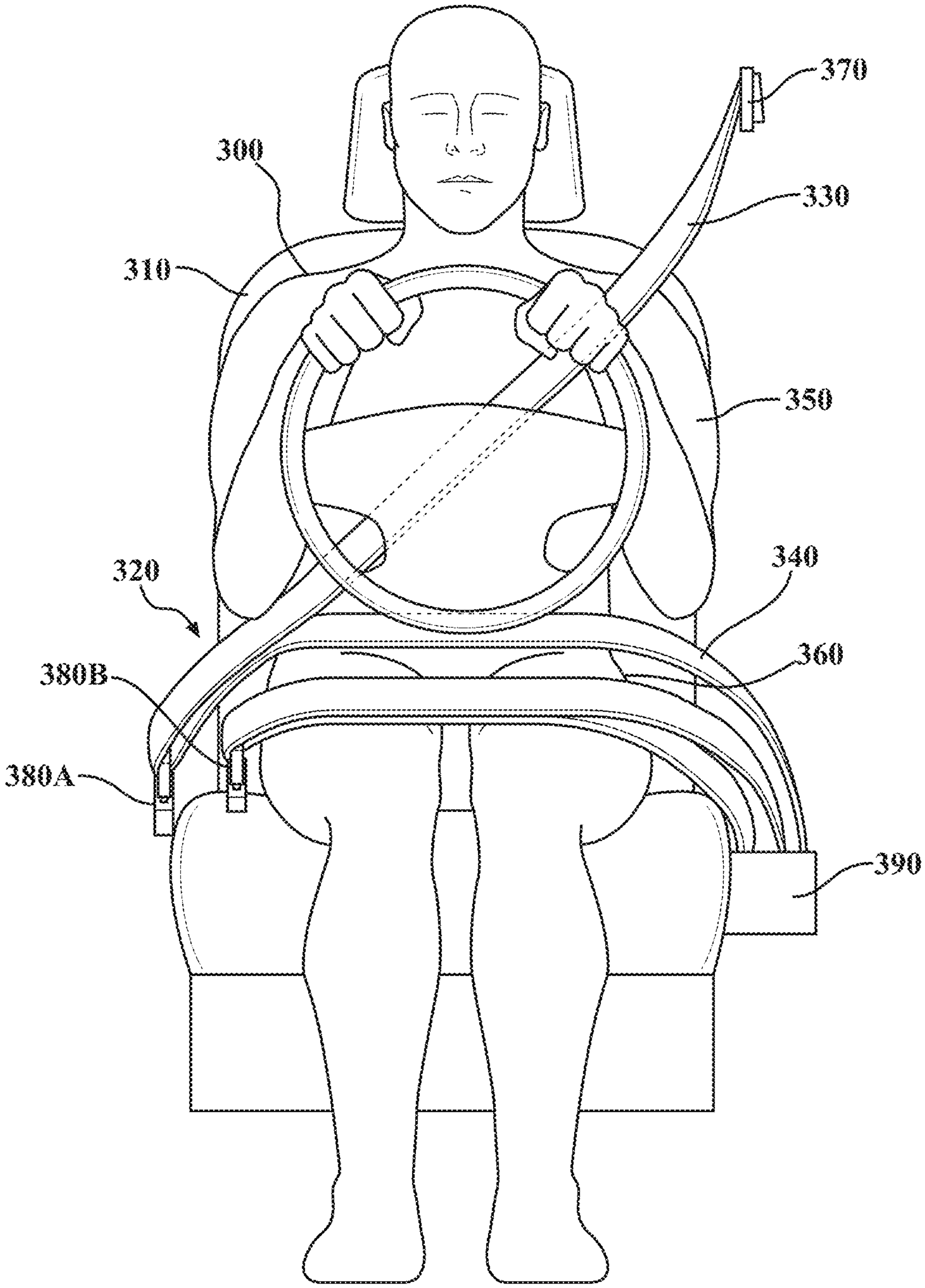
FIG. 3 illustrates one example of a seatbelt arrangement.

As shown in FIG. 3, an example of an occupant 300 of the vehicle 100 is shown. As shown in FIG. 3, the occupant 300 is sitting in a seat 310 of the vehicle 100. As shown, the seat 310 is a driver seat of the vehicle 100, but it should be understood that the seat 310 can be another seat within the vehicle 100, for example, a front passenger seat or a rear passenger seat. In any case, the seat 310 is equipped with a seatbelt arrangement 320. The seatbelt arrangement 320 is configured to restrain the occupant 300 against the seat 310 in the event of a collision, a sudden and/or harsh braking event, a rollover accident, or other dangerous driving scenarios. More specifically, in some arrangements, the seatbelt arrangement 320 includes an upper belt 330 and a lower belt 340, and the occupant 300 has an upper body portion 350 (e.g., a torso area) restrained by the upper belt 330 and a lower body portion 360 (e.g., a hip area and legs) restrained by the lower belt 340. Accordingly, in one arrangement, the upper belt 330 extends across the upper body portion 350 while the lower belt 340 extends across the lower body portion 360 (for example, across the hip area). As shown in FIG. 3, the upper belt 330 and the lower belt 340 are separate belts, each with separate attachments to the vehicle 100 and the seat 310, as described in further detail below. However, it should be understood that in another implementation, the seatbelt arrangement 320 is a three-point seatbelt system in which an upper belt and a lower belt are unitarily formed as a single belt. In such an implementation, the seatbelt system includes a buckle near a hip area of the occupant 300, and the single belt loops through the buckle such that the belt extends across the upper body portion 350 of the occupant 300, loops around the buckle, and extends across the lower body portion 360 of the occupant 300. Moreover, in yet another implementation, the seatbelt arrangement 320 is a five-point seatbelt system such as a seatbelt system used for racecars. Moreover, the seatbelt arrangement 320 can have other arrangements not described herein.

Referring back to FIG. 3, as mentioned above, the seatbelt arrangement 320 includes, in one embodiment, various attachments that connect the upper belt 330 and the lower belt 340 to the vehicle 100 and to the seat 310. Regarding attachment of the upper belt 330, in one instance, the seatbelt arrangement 320 includes a pillar attachment 370. The pillar attachment 370 includes one or more components that are configured to attach the upper belt 330 to a portion of the vehicle 100 inside a passenger compartment of the vehicle 100. For example, the pillar attachment 370 attaches the upper belt 330 to a B-pillar of the vehicle 100. The pillar attachment 370, in one embodiment, includes a pillar loop that guides the upper belt 330 over the upper body portion 350. The seatbelt arrangement 320, in one embodiment, also includes a first buckle 380A and a second buckle 380B. The first buckle 380A, in one instance, is configured to receive a tongue connected to the upper belt 330 to secure the upper belt 330 to the seat 310. Likewise, in one instance, the second buckle 380B is configured to receive a tongue connected to the lower belt 340 to secure the lower belt 340 to the seat 310. The first buckle 380A and the second buckle 380B can be attached to the seat 310 near a hip area of the occupant 300. Finally, regarding the attachments, in one embodiment, the seatbelt arrangement 320 includes a seat attachment 390. The seat attachment 390, in one arrangement, is attached to the seat 310 near a hip area of the occupant 300 and on the opposite side of the seat 310 from the second buckle 380B. Accordingly, the seat attachment 390 and the second buckle 380B function together to attach the lower belt 340 to the seat 310, while the pillar attachment 370 and the first buckle 380A function together to attach the upper belt 330 to the seat 310 and the vehicle 100.

In some instances, when an occupant has a physical impairment, a seatbelt arrangement such as that shown in FIG. 3 is advantageous, as the seatbelt system 170 is able to independently adjust two separate seatbelts to change the tension applied to the seatbelts. In this way, the tension module 230 can decrease the tension of one seatbelt to lessen pain to the occupant in one body area, while the tension module 230 can increase the tension of the other seatbelt to ensure that the occupant is safely restrained within the seat. This will be described in further detail below.

As mentioned above, the tension module 230, in one approach, adjusts the tension of one or more seatbelts of the seatbelt arrangement 320. Accordingly, in one embodiment, the seatbelt arrangement 320 includes one or more tensioners that the seatbelt system 170 can operate to adjust an amount of tension applied to the upper belt 330 and/or the lower belt 340. In one arrangement, the pillar attachment 370 includes a first tensioner connected to the upper belt 330 and operable to adjust an amount of tension applied to the upper belt 330, while the seat attachment 390 includes a second tensioner connected to the lower belt 340 and operable to adjust an amount of tension applied to the lower belt 340. In arrangements in which the seatbelt arrangement 320 includes a three-point seatbelt, the seatbelt arrangement 320 may include one tensioner within the pillar attachment 370, or one tensioner within the seat attachment 390, or two tensioners with one tensioner each within the pillar attachment 370 and the seat attachment 390. Other arrangements of tensioners are also possible.

Figure 4:
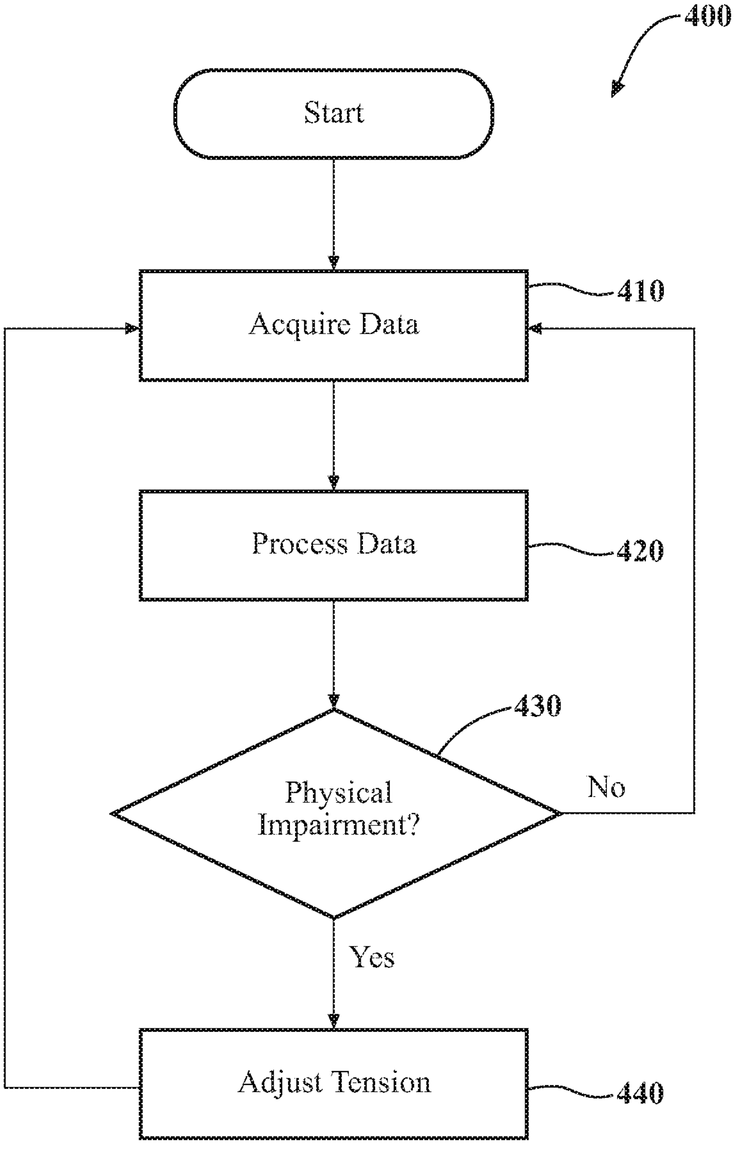
FIG. 4 illustrates one example of a method for operating a seatbelt system.

Additional aspects of the seatbelt system 170 will be discussed in relation to FIG. 4. FIG. 4 illustrates a flowchart of a method 400 that is associated with adjusting the tension of a seatbelt system of a vehicle 100 based on a physical impairment of an occupant of the vehicle 100. Method 400 will be discussed from the perspective of the seatbelt system 170 of FIGS. 1 and 2. While the method 400 is discussed in connection with the seatbelt system 170, it should be appreciated that the method 400 is not limited to being implemented within the seatbelt system 170 but that the seatbelt system 170 is instead one example of a system that may implement the method 400.

At 410, in one approach, the detection module 220 acquires data. As described above, the data can include various types of data that may facilitate detection, by the detection module 220, of a physical impairment of an occupant of the vehicle 100. In some embodiments, at 410, the detection module 220 acquires the data, including the sensor data 250, the occupant profile data 260, and/or the occupant input data 270, at successive iterations or time steps. Thus, the seatbelt system 170, in one embodiment, iteratively executes the functions discussed at 410 to acquire data and provide information therefrom. Furthermore, the detection module 220, in one embodiment, executes one or more of the noted functions in parallel for separate observations in order to maintain updated perceptions.

With reference again to FIG. 4, in one approach, at 420, the detection module 220 processes the data, including the sensor data 250, the occupant profile data 260, and the occupant input data 270. In one approach, the detection module 220 leverages one or more models 280 of the seatbelt system 170 to process the data. The model(s) 280 can include one or more of the models described above, for example, machine learning models, neural networks, etc.

In one approach, as mentioned above, the detection module 220 processes the data to detect a physical impairment of the occupant 300 of the vehicle 100. Accordingly, at 430, the detection module 220 detects whether there is a physical impairment of the occupant 300. In one approach, upon processing the data, the detection module 220 may detect that there is no physical impairment when the data does not indicate a physical impairment (e.g., the occupant 300 is not in pain, is not limping, does not make a statement indicating an impairment, medical records do not indicate an impairment, etc.). If the detection module 220 does not detect a physical impairment, the system 170 can return to acquiring data at 410.

In one approach, upon processing the data, the detection module 220 may detect that there is a physical impairment when the data indicates a physical impairment. For example, the detection module 220 can detect a clavicle injury by detecting that the occupant 300 is touching their chest and saying, "Ouch." The detection module 220 can subsequently detect that the physical impairment is a clavicle injury associated with the upper body portion 350 of the occupant 300. In another example, the detection module 220 can detect that the occupant 300 has a bad hip by detecting that the occupant 300 is approaching the vehicle 100 using a cane as one cue about the impairment. The detection module 220 can subsequently detect that the physical impairment is a bad hip associated with the lower body portion 360 of the occupant 300. The detection module 220 can detect other types of physical impairments as well, as noted above.

In any case, detection of a physical impairment can also include associating the location of the physical impairment with the arrangement of seatbelts of the seatbelt arrangement 320 (e.g., whether the seatbelt arrangement 320 is a three-point system, a four-point system as shown in FIG. 3, a five-point system, etc.). For example, if the physical impairment is a clavicle injury, the detection module 220 can detect which seatbelt of the seatbelt arrangement 320 is contacting and/or not contacting the body area of the clavicle injury. In this way, the seatbelt system 170 can identify which seatbelts of the seatbelt arrangement 320 to adjust to minimize aggravation to the impairment and/or ensure securement of the occupant 300 to the seat 310, as described in further detail below. The detection module 220, in one embodiment, leverages the sensor system 120, for example, the cameras, to visually detect the arrangement of seatbelts. In another embodiment, the data store 240 may include information related to the arrangement of seatbelts for reference by the detection module 220.

In any case, if the detection module 220 detects a physical impairment, the method 400 can continue to 440. At 440, in one implementation, the tension module 230 adjusts an amount of tension applied to the seatbelt arrangement 320. In instances in which the seatbelt arrangement 320 is a three-point seatbelt system, the tension module 230 can adjust the tension applied to the single seatbelt. In instances in which the seatbelt arrangement 320 is a system as shown in FIG. 3, the tension module 230 can adjust an amount of tension applied to the upper belt 330 and/or the lower belt 340. In either case, or in other arrangements, the tension module 230 adjusts an amount of tension applied to a portion of the seatbelt arrangement 320 based on the physical impairment. In one example, the tension module 230 adjusts an amount of tension applied to a portion of the seatbelt arrangement 320 that is contacting the body portion associated with the physical impairment, as described in further detail below. In any case, the tension module 230 is configured to operate one or more tensioners of the seatbelt arrangement 320 to adjust the amount of tension.

In one implementation, the tension module 230 decreases the amount of tension applied to a portion of the seatbelt arrangement 320 contacting the body portion of the occupant 300 associated with the physical impairment. As a result, that portion of the seatbelt arrangement 320 will no longer apply as much pressure to the area of impairment, thus minimizing aggravation of the impairment or further injury to that body area, for example, in the event of a collision. On the other hand, in some implementations, the tension module 230 can also increase the amount of tension applied to a portion of the seatbelt arrangement 320 that contacts the occupant 300 in an area not associated with the physical impairment. As a result, that portion of the seatbelt arrangement 320 will provide additional securement and restraint to the occupant 300 to provide protection to the occupant 300 in the event of a dangerous driving scenario such as a collision.

In one example, the tension module 230 identifies a physical impairment of the upper body portion 350 of the occupant 300, decreases an amount of tension applied to a portion of the seatbelt restraining the upper body portion 350, and increases an amount of tension applied to a portion of the seatbelt restraining the lower body portion 360 of the occupant 300. For example, as mentioned above, the physical impairment may be a clavicle injury. In this case, the tension module 230 can operate the tensioner within the pillar attachment 370 to decrease the amount of tension applied to the upper belt 330 to minimize aggravation to the clavicle injury. The tension module 230 can also operate the tensioner within the seat attachment 390 to increase the amount of tension applied to the lower belt 340 to provide additional securement to the occupant 300.

In another example, the tension module 230 identifies a physical impairment of the lower body portion 360 of the occupant 300, decreases an amount of tension applied to a portion of the seatbelt restraining the lower body portion 360, and increases an amount of tension applied to a portion of the seatbelt restraining the upper body portion 350 of the occupant 300. For another example, as mentioned above, the physical impairment may be a bad hip. In this case, the tension module 230 can operate the tensioner within the seat attachment 390 to decrease the amount of tension applied to the lower belt 340 to minimize aggravation to the bad hip. The tension module 230 can also operate the tensioner within the pillar attachment 370 to increase the amount of tension applied to the upper belt 330 to provide additional securement to the occupant 300.

The tension module 230, in some instances, is configured to adjust the tension by increasing or decreasing the tension by a certain percentage of a standard amount of tension applied to the seatbelt arrangement 320. In some instances, a standard amount of tension is about 0.2 to about 0.7 dekanewtons (daN) of force. The tension module 230 can adjust the tension, in some instances, by about 50% larger or smaller than the standard amount, about 40% larger or smaller than the standard amount, about 60% larger or smaller than the standard amount, or another amount of force relative to the standard amount. Moreover, the amount of adjustment in the tension of the seatbelt arrangement 320 may be different for two or more seatbelts of the seatbelt arrangement 320. For example, the amount of tension of the upper belt 330 may be increased or decreased by about 40%, while the amount of tension of the lower belt 340 may be increased or decreased by about 60%, and vice versa.

Moreover, in some instances, the amount of adjusted tension may be relative to the type of detected physical impairment. For example, if the physical impairment is minor, such as a bruise on the shoulder, the amount of tension applied to the upper belt 330 may be decreased by about 20%, while, if the physical impairment is major, such as a recent hip surgery, the amount of tension applied to the lower belt 340 may be decreased by about 80%. In some cases, furthermore, the amount of tension applied to one seatbelt may be adjusted relative to the adjusted amount of tension applied to another seatbelt. For example, if the amount of tension applied to the upper belt 330 is adjusted by a relatively small amount, the amount of tension applied to the lower belt 340 may also be adjusted by a relatively small amount. On the other hand, if the amount of tension applied to the upper belt 330 is adjusted by a relatively large amount, the amount of tension applied to the lower belt 340 may also be adjusted by a relatively large amount. In any case, upon adjustment of the tension, the method 400 can proceed back to 410.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drives (SSDs), and/or other non-transitory electronic storage medium. In one configuration, the data store 115 is a component of the processor(s) 110. The data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. The sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects in the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide connection to a global positioning system, a local positioning system or a geolocation system.

In one or more configurations, the vehicle systems 140 function cooperatively with other components of the vehicle 100. For example, the processor(s) 110, the seatbelt system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the seatbelt system 170, and/or the automated driving module(s) 160 may control some or all of these vehicle systems 140.

For example, when operating in the autonomous mode, the processor(s) 110, the seatbelt system 170, and/or the automated driving module(s) 160 control the heading and speed of the vehicle 100. The processor(s) 110, the seatbelt system 170, and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, in one configuration, the vehicle 100 includes one or more actuators 150. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 either independently or in combination with the seatbelt system 170 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

The arrangements disclosed herein provide the benefit of building trust of one or more occupants of a vehicle in an automated function of the vehicle. Moreover, the arrangements disclosed herein provide the benefit of building trust in a manner that is customized to the occupant(s) so that efforts to build trust are more successful. As a result, the occupant(s) may have a safer and more comfortable ride in the vehicle.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/ units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

The arrangements described herein provide the advantage of decreasing the pressure applied by a seatbelt on a physical impairment of an occupant of a vehicle, thus making the seatbelt more comfortable and less painful for the occupant to wear. The arrangements described herein also provide the advantage of redistributing tension between various belts of a seatbelt to reduce pressure on a physical impairment of an occupant, while increasing pressure on another body part of the occupant, thus making the seatbelt more comfortable for the occupant while still safely retaining the occupant within the vehicle.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, OR ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

In this description, uses of "front," "forward" and the like, and uses of "rear," "rearward" and the like, refer to the longitudinal directions of the vehicle. "Front," "forward," and the like refer to the front (fore) of the vehicle, while "rear," "rearward" and the like refer to the back (aft) of the vehicle. Uses of "side," "sideways," "transverse" and the like refer to the lateral directions of the vehicle, with "driver's side" and the like referring to the left side of the vehicle, and "passenger side" and the like referring to the right side of the vehicle.

Aspects herein can be embodied in other forms without departing from the spirit or essential attributes thereof. Accordingly, reference should be made to the following claims, rather than to the foregoing specification, as indicating the scope thereof.

What is claimed:

1. A system, comprising:

a processor; and a memory in communication with the processor and storing a module including instructions that, when executed by the processor, cause the processor to:

detect, based, at least in part, on data regarding an occupant of a vehicle, a physical impairment of the occupant, including a location of the physical impairment;

identify a first portion of a seatbelt contacting the occupant at the location;

decrease, based on the physical impairment, tension applied to the first portion; and increase, based on the physical impairment, tension applied to a second portion of the seatbelt contacting the occupant in an area not associated with the physical impairment.

2. The system of claim 1, wherein the instructions to detect the physical impairment further include instructions to detect at least one of an injury or an area of low bone density, tendinitis, pain syndrome, or nerve syndrome.

3. The system of claim 1, wherein the seatbelt includes:

belts including an upper belt restraining a torso area of the occupant and a lower belt restraining a hip area of the occupant;

buckles including a first buckle configured to connect the upper belt to a seat including the seatbelt and a second buckle configured to connect the lower belt to the seat; and tensioners including an upper tensioner connected to the upper belt and operable to adjust an amount of tension applied to the upper belt and a lower tensioner connected to the lower belt and operable to adjust an amount of tension applied to the lower belt, wherein the instructions to adjust the amount of tension applied to the seatbelt further include instructions to operate the tensioners to adjust the amount of tension applied to the upper belt and the lower belt.

4. The system of claim 1, wherein the location is an upper body portion of the occupant, and wherein the instructions to decrease the tension applied to the first portion include instructions to decrease an amount of tension applied to a portion of the seatbelt restraining an upper body portion of the occupant, and wherein the instructions to increase of the tension applied to the second portion include instructions to increase an amount of tension applied to a portion of the seatbelt restraining a lower body portion of the occupant.

5. The system of claim 1, wherein the location is a lower body portion of the occupant, and wherein the instructions to decrease the tension applied to the first portion include instructions to decrease an amount of tension applied to a portion of the seatbelt restraining the lower body portion, and wherein the instructions to increase the tension applied to the second portion include instructions to increase an amount of tension applied to a portion of the seatbelt restraining an upper body portion of the occupant.

6. The system of claim 1, wherein the instructions to detect the physical impairment further include instructions to receive an electronic input indicating the location of the physical impairment.

7. The system of claim 1, wherein the instructions to detect the physical impairment further include instructions to control at least one sensor to scan the occupant and analyze sensor data from the at least one sensor for visual indicators of the physical impairment, wherein the visual indicators include at least one of: a cast, a wound dressing, a brace, or a bruise.

8. The system of claim 1, wherein the instructions to detect the physical impairment further include instructions to detect contextual indicators of the physical impairment from at least one of: text messages or speech of the occupant.

9. The system of claim 1, wherein the instructions to decrease the tension of the first portion include instructions to decrease the tension by a first value, and wherein the instructions to increase the tension of the second portion include instructions to increase the tension by a second value that is different from the first value.

10. The system of claim 1, wherein the instructions to decrease the tension of the first portion include instructions to decrease the tension based on a severity of the physical impairment.

11. The system of claim 1, wherein the instructions to increase the tension of the second portion include instructions to increase the tension based on an amount by which the tension of the first portion is decreased.

* * * * *